United States Patent [19]

Gingras, Sr. et al.

[11] 4,186,426

[45] Jan. 29, 1980

[54] EMERGENCY LIGHTING DEVICE

[75] Inventors: Joel A. Gingras, Sr., Doylestown, Pa.; William R. Heffernan, Westfield, N.J.; Mary-Louise Vega, Califon, N.J.; Michael T. Beachem, Somerset, N.J.

[73] Assignee: American Cyanamid Company, Stamford, Conn.

[21] Appl. No.: 861,772

[22] Filed: Dec. 19, 1977

[51] Int. Cl.² .................. F21V 21/00; F21V 9/16; F21L 3/00
[52] U.S. Cl. .................. 362/34; 116/63 P; 206/45.23; 206/803; 362/154; 362/159; 362/171; 362/375
[58] Field of Search .................. 362/34, 159, 375, 409, 362/171, 154, 119, 120, 155, 374, 387; 206/45.23, 803; 116/63 P

[56] References Cited

U.S. PATENT DOCUMENTS

| 1,899,012 | 2/1933 | Buttrick | 206/45.23 |
|---|---|---|---|
| 2,131,093 | 9/1938 | Cage | 206/45.23 |
| 2,220,407 | 11/1940 | Joss | 206/803 |
| 3,256,853 | 6/1966 | Underwood | 116/63 P |
| 3,829,678 | 8/1974 | Holcombe | 362/34 |
| 3,900,728 | 8/1975 | Holcombe | 362/34 |
| 3,933,118 | 1/1976 | Lyons et al. | 116/63 P |
| 4,064,428 | 12/1977 | Zandt | 362/34 |

Primary Examiner—Howard A. Birmiel
Attorney, Agent, or Firm—Gordon L. Hart

[57] ABSTRACT

A chemiluminescent lightstick with an attached actuating device is stored inside a container having a hinged lid which opens for access to and for display of the lightstick. The container comprises clamping means by which the lightstick is held at a display position in the open container. The lightstick as clamped in the display position holds open the lid of the container. In this mode, the lightstick and container make a convenient lantern.

7 Claims, 6 Drawing Figures

EMERGENCY LIGHTING DEVICE

The invention relates to an emergency lighting device which comprises a chemiluminescent lightstick, an attached manual operating device for actuating the lightstick and a container adapted for use in storage and display of the lightstick.

The utility of chemiluminescent lightsticks in emergency situations is known. Several lightsticks have been described which are suitable for such use. Essentially a chemiluminescent lightstick comprises a flexible, translucent outer tube which encloses several chemical components of a chemiluminescent mixture with frangible means separating those components within the outer tube. When the frangible separating means is broken, the components combine within the outer tube and react to produce chemical light. Typically, a lightstick would comprise a flexible polyethylene outer tube sealed at both ends and one or two inner glass vials, each vial containing separate components of the chemiluminescent mixture. While the components are separated by the intact vials within the outer tube they are practically inert and will not produce light. When the inner vials are broken by actuation of the flexible outer tube, the components are mixed within the outer tube and the mixture of reactants produces chemiluminescent light. This reaction produces light without emission of heat, flame, sparks or gases, hence the lightstick is safe for lighting in explosive environments, and can be used without danger of causing fire or of burning the user. The reaction is contained entirely within the outer tube so the light will not be extinguished by contact of the lightstick with water; the lightstick can even be used while submerged in water. Certain lightsticks can emit light of considerable intensity for several hours after actuation, so they can be used as markers for rescue operations at night.

The present invention provides a lightstick in a package that is adapted for storage of the lightstick for ready access, and that is especially adapted for ease and convenience of use of the light in several kinds of emergency situations.

A particularly preferred lightstick for use in the present invention has two reactive components of a chemiluminescent mixture stored in separate glass vials within the outer container. These two components comprise a reactive oxalate ester in one vial and a reactive peroxy compound in the other vial. Both of these components would be subject to gradual deterioration by contact with air, which might penetrate the outer polyolefin tube but which cannot penetrate the glass vials. Thus a lightstick of this kind will have long storage life without the need for an hermetic envelope to contain the lightstick in storage. In those preferred embodiments having two inner glass vials, a third separate liquid component, consisting only of ingredients which are not air-sensitive, such as solvents, fluorescers and the like may occupy some of the space within the outer tube that is not occupied by the glass vials. Reference is made to the copending application Ser. No. 758,253, filed Jan. 10, 1977, by Mary-Louise Vega, titled "Chemical Lighting Process and Composition" for more detailed description of lightsticks of this kind.

For convenience in actuating the lightstick when light is needed, the lightstick is provided with an attached actuating device, which provides lever and fulcram means by which one can conveniently bend the outer tube and thereby break the inner vials. One can conveniently bend the outer tube against the fulcram by squeezing the tube and lever together using the palm and fingers of one hand to actuate the lightstick. A convenient device for this use has been described in greater detail by Holcombe in U.S. Pat. No. 3,900,728, patented Aug. 19, 1975.

The invention provides a lightstick and an attached actuating device of the kind described in a container which is especially adapted for storage of the lightstick with the actuating device attached until the lightstick is needed, and is adapted for ready access of the same to the user when needed. The container is further adapted with means for use of the container in combination with the lightstick for display of the light to advantage in several kinds of emergency situations.

The container is a box with a hinged lid, and it can be used with the lid closed to safely and compactly contain the lightstick. The closed container encloses the lightstick and is of material strong enough to prevent accidental activation of the lightstick during storage, as by accidental bending or impact, or the like. The container lid is adapted with releasable latch means for holding the hinged lid of the box closed during storage, but the latch means can be easily released by hand operation to open the container. On the inside of the container, releasable storage clamping means are provided for holding the lightstick at a fixed storage position inside the container, and winding pegs are provided by which one end of a lanyard can be attached to the container and the lanyard can be wound on the pegs for storage of the lanyard in the container. Other releasable clamping means are provided inside the box for holding the lightstick at a display position in which the lightstick cooperates with the container to hold open the lid of the container while the light is displayed. In some preferred embodiments, all, or an appropriate portion of the inner surfaces of the container are made reflective to enhance display of the light when the lightstick is mounted at the display position in the container. In some preferred embodiments the container is adapted on its outer surface with means for attaching the container to a person's clothing or the like for convenience in carrying or displaying the light package.

A preferred embodiment of the invention will be described in more detail by reference to the drawings, wherein.

Figure 1:
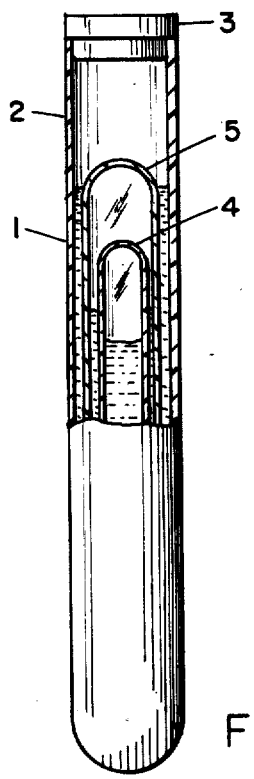
FIG. 1 is a sketch of the lightstick that is most preferred for use in accordance with the invention, showing the several parts intact, as they are before the lightstick is actuated to produce light.

Any lightstick that is capable of storage in inactive state and that can be easily actuated to produce chemiluminescence can be used in accordance with the invention. We prefer to use lightsticks of the particular kind that is described herein in more detail because they are especially adapted to have excellent storage stability without need for an outer hermetic covering and they can produce relatively greater light intensity during the first few hours of use. These most preferred lightsticks are described in more detail in the aforementioned Vega et al. U.S. Pat. application Ser. No. 758,253. Referring to FIG. 1 the lightstick (1) comprises a translucent, flexible outer tube (2) closed at one end and having an opening at its other end through which the contents of the lightstick are inserted, and in which a plug (3) is inserted and sealed to retain the contents within the outer tube. Inside the tube are two glass vials, 4 and 5 each containing a separate liquid component of the chemiluminescent mixture.

In the embodiment shown in the drawing, one of the glass vials is contained within the other. The inner glass vial (4) is about 85 mm. long, 7.5 mm. outside diameter, 0.2 mm. wall thickness and is partially filled with 2.5 ml. of a solution made from hydrogen peroxide and 0.1 gm. of sodium salicylate in 773 ml. dimethylphathalate and 212 ml. tert-butanol. The outer glass vial (5) is 12.48 mm. outer diameter, 0.4 mm. wall thickness and of a length to fit within the outer tube and to contain the sealed inner tube and also to contain 6 ml. of a solution made from 135.1 gm. bis-6(carbopentoxy-2,4,5-trichlorophenyl)oxalate 1.113 gm. of 9,10-bis(phenylethynyl)anthracene and enough dibutylphthalate to make one liter. The outer tube (2) is a molded polyethylene cylindrical tube closed at one end and open at the other. It is about 18 mm. in diameter, has wall thickness about 1.4 mm. and is about 130 mm. long. In addition to the glass vials with their contents, the outer tube also contains 5 ml. of a solution made with 1.13 grams of 9,10-bis(phenylethynyl)-anthracene and enough dibutylphthalate to make one liter of solution. A polyethylene plug (3) is inserted and sealed in the open end of the outer tube to contain all of the contents within the tube.

Figure 2:
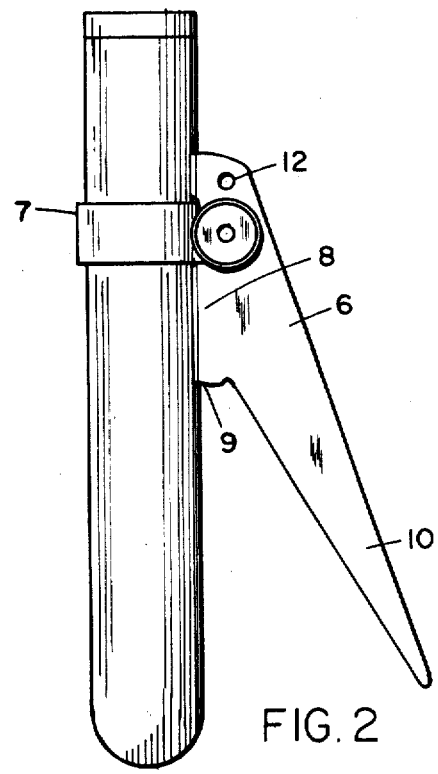
FIG. 2 is a sketch of the lightstick with an attached actuating device.

The lightstick as used in accordance with the invention has an attached actuating device. This device provides a fulcrum against which the lightstick can be manually bent by squeezing the lightstick towards the lever on the device. This actuation can be conveniently performed by squeezing the assembly in one hand. As shown in FIG. 2 the actuating device comprises a steel handle (6) attached to the outer tube by a steel band (7) which fits snugly around the outer tube (2) of the lightstick. The band (7) is bolted to the handle through an extension of the band which extends inside the handle. A straight length (8) of the handle is held tangent longitudinally against the outer wall of the lightstick. The fulcrum (9) of the handle is at the end of the straight length nearer to the center of the lightstick than the band. The lever arm (10) of the handle extends from the band at an angle diverging from the straight length and extends beyond the fulcrum.

In accordance with the invention, a lanyard (11) is provided by which the lightstick is secured to the container in order to prevent accidental loss of the lightstick. The lanyard may be of any length; a convenient length is about two to three feet. A small hole (12) is provided in the actuating handle, through which the lanyard is tied to attach one end of the lanyard to the lightstick and actuating assembly. The other end of the lanyard is secured to the inside of the container.

Figure 3:
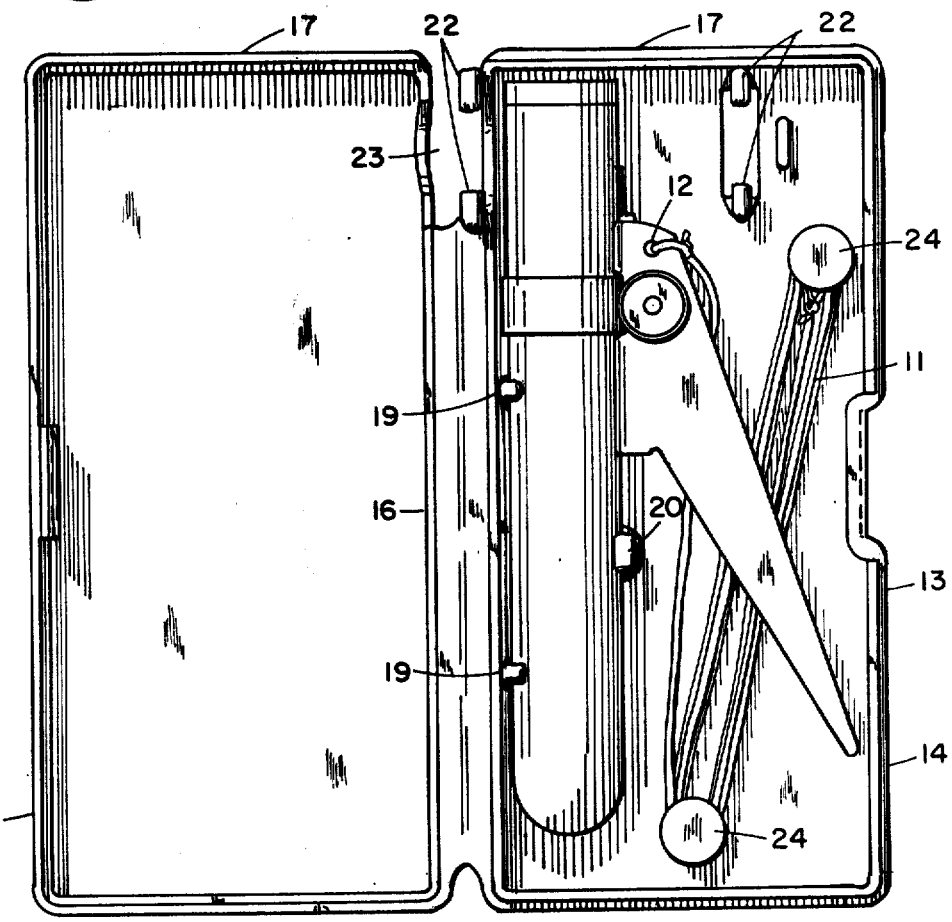
FIG. 3 is a top view of the container opened to show the lightstick and actuating device clamped at storage position inside the box.
Figure 4:
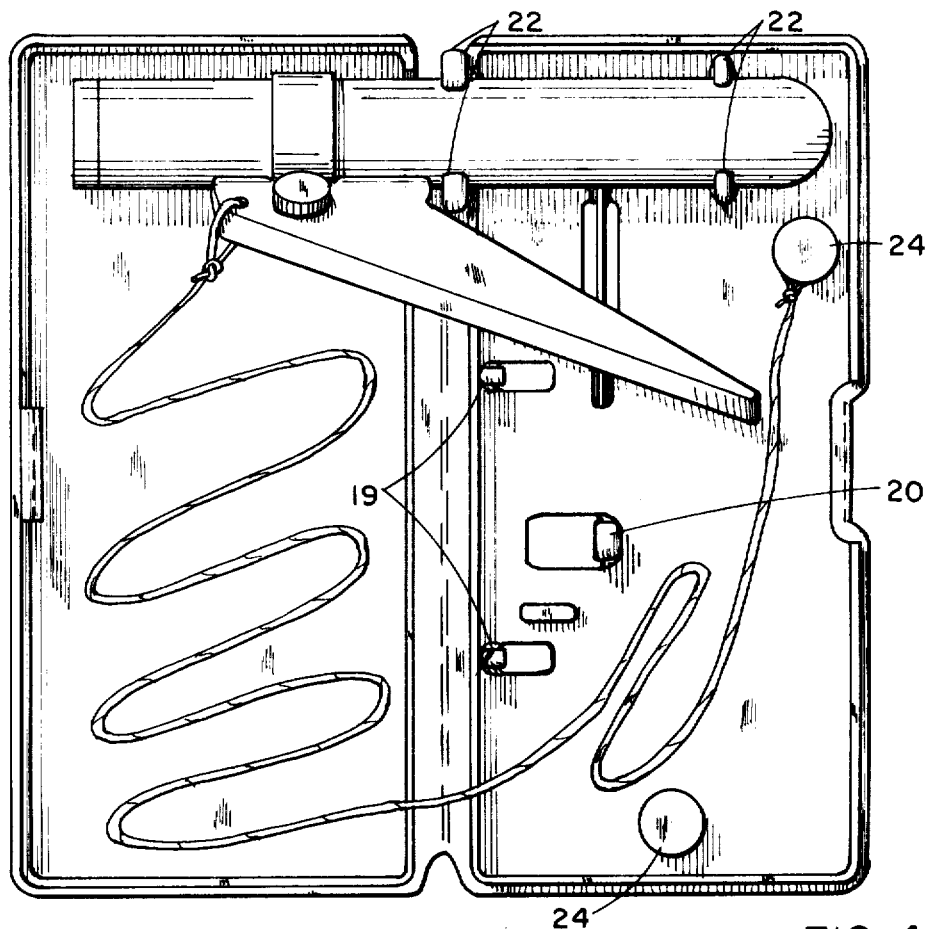
FIG. 4 is another top view of the open container showing the lightstick clamped at its display position.
Figure 5:
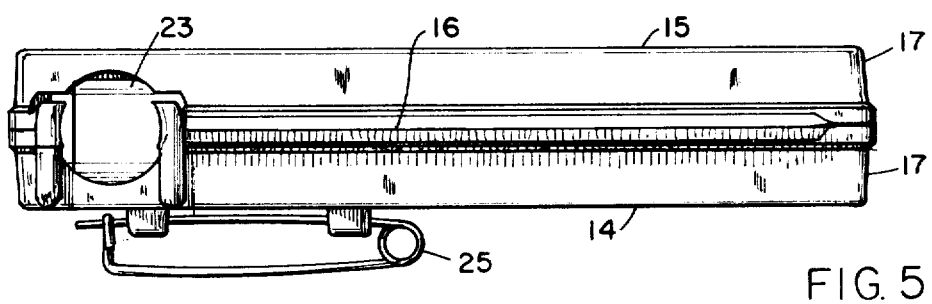
FIG. 5 is a rear view of the container with its lid closed, showing the hinge which joins the lid to the box and showing an aperture which is provided in the rear walls for fitting the lightstick in its display position.
Figure 6:
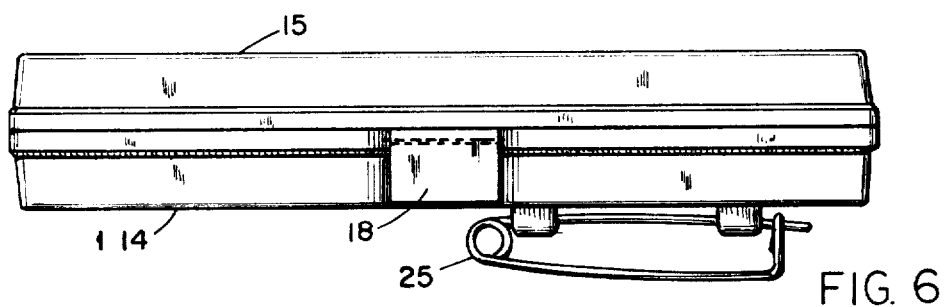
FIG. 6 is a front view of the closed container showing the latch for holding the lid shut.

Referring now to FIG. 3, the container (13) comprises a box (14) with a lid (15) hinged thereto by a hinge (16) that permits opening and closing the lid on the hinge through 180° between the closed position and the fully open position. At the fully open position shown in FIG. 3, the flat top of the lid and the flat bottom of the box preferably lie approximately in the same plane. In the embodiment shown, both the lid and box have front, side and rear walls (17), joined at the corners to enclose the inside of the container. The walls of the lid and box are of approximately equal depth and the hinge joins the edges of the rear walls of both the lid and the box. Opposite the hinge at the front of the container the lid and box are fitted at the center of the front walls with a latch and notch set (18) which will engage to hold the lid shut when the box is closed. The latch and notch preferably can be operated by simple finger operations to fasten or release their engagement.

Inside the box are several fittings for clamping the lightstick in storage and display positions and for securing the lanyard and winding it for storage. In the embodiment shown in FIG. 3, the entire container and its fittings are integrated as a single polypropylene injection molded unit. Extending inward from the flat bottom of the box are integrally molded lugs and pins which serve various storage functions. Along the rear wall of the box are two spaced apart lugs (19) which cooperate with an opposed third lug (20) spaced inwardly from the back wall by the diameter of the lightstick. The third lug is offset with respect to the two rear wall lugs to cooperatively hold the lightstick against the other two lugs when the lightstick is pressed between the three lugs. At the upper end of each of the three lugs a lip (21) extends inwardly towards the lightstick to hold the lightstick down. The three lugs are resilient enough to permit the upper ends of opposed lugs to spread slightly to permit the widest diameter of the lightstick to be pressed through the lips, but are strong enough to hold the lightstick in place between the lugs. This is the storage position for the lightstick and the box and lid are wide enough from front to rear to contain the lightstick in storage position with its attached handle inside the closed box. At one end inside the box, two sets of directly opposed lugs (22) are provided for clamping the lightstick in its display position. These are used only when the lid is fully opened and the lightstick is clamped with its length extending crosswise from the box onto the lid. To accommodate the lightstick in this display position, portions of the rear walls of the lid and box are cut out to form an aperture (23) which permits the lightstick to lie inside the box and opened lid, extended across the aperture parallel to the plane of the bottom of the box. In the embodiment shown in the drawings, there are two sets of opposed clamping lugs (22) extending upward from the bottom of the box. The two lugs in each set are spaced apart by the diameter of the lightstick. One set of two opposed lugs stands in the plane of the rear wall of the box. One lug of this set stands at each side of the aperture (23) that has been cut away from the rear wall of the box to make way for the lightstick to extend across the walls when the lid is open. The second set of opposed lugs stands inside the box towards the longitudinal center line of the box and holds the lightstick in position at right angles to that line. The two sets of opposed lugs (22) are spaced apart to retain the lightstick by clamping it at two spaced apart points along its length. The two lugs in each set are spaced apart by the width of the outer tube and the lugs are equipped with inwardly extending lips for retaining the lightstick between the lugs until it is pulled out forcibly to pass through the lips by resilient yielding of the lugs.

On an outside surface of the container, in our most preferred embodiments, we provide an attached metal clip (25) which can be used for attachment of the container to an article of clothing such as a person's waist belt or coat pocket, or the like. This permits one to carry the container either closed or at a visible position for displaying the light with the container opened and the lightstick in its display position. When so displayed, the lightstick as held by the retaining lugs extends across the back walls from the box into the open lid and cooperates to retain the lid at its open position. In a preferred embodiment the inside surface of the box and lid is at least partly covered with reflective material, e.g. bright metal foil, which serves as a reflector behind the lightstick at display position to intensify the radiation outward from the container.

The container can be stored with the lightstick inside at the storage position, with the handle attached to the lightstick and the lanyard secured to the handle and to one of the winding posts on which it is wound. The latch and notch set holds the lid closed. The box can be stored at any convenient place. The container shown in the drawings, when closed is about 2¾" wide, 5¾" long and 1" deep. This size box can be conveniently stored in the pocket of a life jacket, or several containers may be stored in compartments on a life raft, etc. The polyolefin latch can be released from its notch by forcing the clasp outward. There is sufficient resiliency of the polyolefin to hold the clasp in the notch but it will yield to the manual force of one finger to pull the latch from the notch. The lid is opened on its hinge and the lightstick is pulled away from its storage lugs. To avoid losing the container if it were dropped, one may attach the box to an article of clothing. One may unwind the lanyard, actuate the light by squeezing the lightstick towards the handle to bend the tube and break the inner vials. It is preferred to shake the tube enough to mix the chemicals inside. The light produced by the chemiluminescent reaction will begin almost immediately. For signalling, the light can be spun on the lanyard, to make the appearance of a circle of light. The lightstick can be clamped in the display position and used as a signal or to provide light for working, or the like. The open container with the activated lightstick clamped at the display position can be attached to the person or to a gunwale or the like to serve as a lantern.

We claim:

1. An emergency lighting device comprising:
    a chemiluminescent lightstick comprising a flexible, translucent outer tube enclosure, and within said outer tube several chemical components of a chemiluminescent mixture separated by frangible means breakable by flexibly bending said outer tube for combining said components to produce chemical light;
    an actuating device comprising a fulcrum and a lever attached to the outside of said outer tube for manually bending said flexible outer tube against the fulcram of said device by manual cooperation of said tube and lever;
    a container defining a storage space within said container for storage at a storage position therein of said lightstick with said attached actuating device, said container comprising a lid operable on a hinge between an open position for access to remove said lightstick with actuating device from said storage space and a closed lid position for enclosing the same within said storage space;
    said lid being rotatable on said hinge through 180 degrees from its closed lid position to an open display position at which said lid has been rotated 180° on said hinge from said closed position, and clamping means inside said box for releasably clamping said lightstick at a display position which is different from said storage position, in which display position said lightstick cooperates with said clamping means to hold said lid at said open display position for display of the lightstick.

2. An emergency lighting device defined by claim 1, said container being a single polyolefin molding having an integral molded polyolefin hinge joining said lid to the said box, integral molded polyolefin latching means for releasably holding said lid at its closed position, integral molded polyolefin retaining lugs inside said container for releasably retaining said lightstick at its storage position within storage space and integrally molded clamping means for releasably clamping said lightstick at its display position.

3. An emergency lighting device defined by claim 1, further comprising a lanyard attached at one of its ends to said actuating device, a first lanyard pin inside said container and attached to the other end of said lanyard, a second lanyard post inside said container for winding said lanyard around said first and second lanyard posts for storage of said lanyard within said storage space.

4. An emergency lighting device defined by claim 2, further comprising a lanyard attached at one of its ends to said actuating device, a first lanyard pin integrally molded on an inside surface of said container and attached to the other end of said lanyard, a second lanyard post integrally molded on an inside surface of said container for winding said lanyard around said first and second lanyard posts for storage of said lanyard within said storage space.

5. An emergency lighting device defined by claim 1 wherein said chemiluminescent lightstick has all of its air-sensitive chemical components inside frangible glass vials which are inside the defined outer tube.

6. An emergency lighting device defined by claim 2 wherein the molded polyolefin container is of molded polypropylene.

7. An emergency lighting device defined by claim 1 wherein the defined actuating device comprises a handle which comprises said lever and fulcrum and which is attached by a steel band encircling said tube and bolted to said handle.

* * * * *